United States Patent
Pei (10) Patent No.: US 12,276,521 B2
(45) Date of Patent: Apr. 15, 2025

(54) METHOD FOR PROCESSING MAP DATA, AND ELECTRONIC DEVICE

(71) Applicant: APOLLO INTELLIGENT CONNECTIVITY (BEIJING) TECHNOLOGY CO., LTD., Beijing (CN)

(72) Inventor: Xinxin Pei, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 18/087,666

(22) Filed: Dec. 22, 2022

(65) Prior Publication Data

US 2023/0131901 A1    Apr. 27, 2023

(30) Foreign Application Priority Data

Mar. 28, 2022    (CN) .......................... 202210313659.7

(51) Int. Cl.
*G01C 21/36* (2006.01)
*G01C 21/00* (2006.01)

(52) U.S. Cl.
CPC ..... *G01C 21/3826* (2020.08); *G01C 21/3867* (2020.08)

(58) Field of Classification Search
CPC .................................................. G01C 21/3826
See application file for complete search history.

(56) References Cited

U.S. PATENT DOCUMENTS

| | | | |
|---|---|---|---|
| 6,448,969 B1 | 9/2002 | Minakawa et al. | |
| 10,006,990 B2* | 6/2018 | Van Taunay | G01S 11/06 |
| 2017/0213383 A1* | 7/2017 | Lawler | G06T 19/003 |
| 2021/0181756 A1 | 6/2021 | Zhu et al. | |

FOREIGN PATENT DOCUMENTS

| | | | |
|---|---|---|---|
| CA | 2225400 A1 * | 1/1997 | |
| CN | 111460071 A | 7/2020 | |
| CN | 111721308 A | 9/2020 | |
| CN | 111782747 A | 10/2020 | |
| CN | 112129266 A | 12/2020 | |
| CN | 114092660 A | 2/2022 | |
| CN | 114184179 B * | 5/2022 | |
| EP | 1107189 A2 | 6/2001 | |
| EP | 1927954 A1 | 6/2008 | |
| WO | 2009143870 A1 | 12/2009 | |

OTHER PUBLICATIONS

Office Action for Chinese Application No. 202210313659.7, dated Jun. 15, 2023, 26 pages.
Search Report for European Application No. 22217097.9, dated Aug. 25, 2021, 9 pages.
Office Action for Chinese Patent Application No. 202210313659.7, dated Sep. 14, 2023, 20 pages.

* cited by examiner

*Primary Examiner* — Shelley Chen
(74) *Attorney, Agent, or Firm* — Lippes Mathias LLP (57) ABSTRACT

A method for processing map data includes: determining a first region for which a map display image is to be drawn; determining multiple first reference points within the first region according to a second region corresponding to the first region; determining relative height data of the first region according to positions and real height data of all the first reference points; and determining a map display image of a position to be displayed according to the relative height data, in which the position to be displayed is within the first region.

13 Claims, 9 Drawing Sheets

METHOD FOR PROCESSING MAP DATA, AND ELECTRONIC DEVICE

CROSS-REFERENCE TO RELATED APPLICATIONS

This application claims the benefit of priority to Chinese Patent Application No. 202210313659.7, filed on Mar. 28, 2022, the contents of which are incorporated herein by reference in their entireties for all purposes.

TECHNICAL FIELD

The present disclosure relates to the field of computer technology, in particular to the technical field of autonomous driving, intelligent transportation, intelligent cockpit, etc.

BACKGROUND

With the development of computer technology, all aspects of human production and life can be automated and labor-saving. For example, automated production combined with computer technology, computer technology-assisted management, teaching, etc. Automatic driving or driverless technology is also a product of the rapid development of computer technology.

In order to ensure a smooth, comfortable and safe driving process, it is needed to provide more accurate map data for a driving control apparatus or a controller in the process of automatic driving or driverless driving.

SUMMARY

According to an aspect of the present disclosure, there is provided a method for processing map data, including: determining a first region for which a map display image is to be drawn; determining multiple first reference points within the first region according to a second region corresponding to the first region; determining relative height data of the first region according to positions and real height data of all the first reference points; and determining a map display image of a position to be displayed according to the relative height data, in which the position to be displayed is within the first region.

According to another aspect of the present disclosure, there is provided an electronic device, including: at least one processor and a memory communicatively coupled to the at least one processor. The at least one processor is configured to: determine a first region for which a map display image is to be drawn; determine multiple first reference points within the first region according to a second region corresponding to the first region; determine relative height data of the first region according to positions and real height data of all the first reference points; and determine a map display image of a position to be displayed according to the relative height data, in which the position to be displayed is within the first region.

According to another aspect of the present disclosure, there is provided a non-transitory computer-readable storage medium having computer instructions stored thereon. The computer instructions are configured to cause a computer to implement a method for processing map data, including: determining a first region for which a map display image is to be drawn; determining multiple first reference points within the first region according to a second region corresponding to the first region; determining relative height data of the first region according to positions and real height data of all the first reference points; and determining a map display image of a position to be displayed according to the relative height data, in which the position to be displayed is within the first region.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the present disclosure, in which.

DETAILED DESCRIPTION

Embodiments of the present disclosure are described below with reference to the accompanying drawings, including various details of the embodiments of the present disclosure to facilitate understanding, which shall be considered illustrative. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Figure 1:
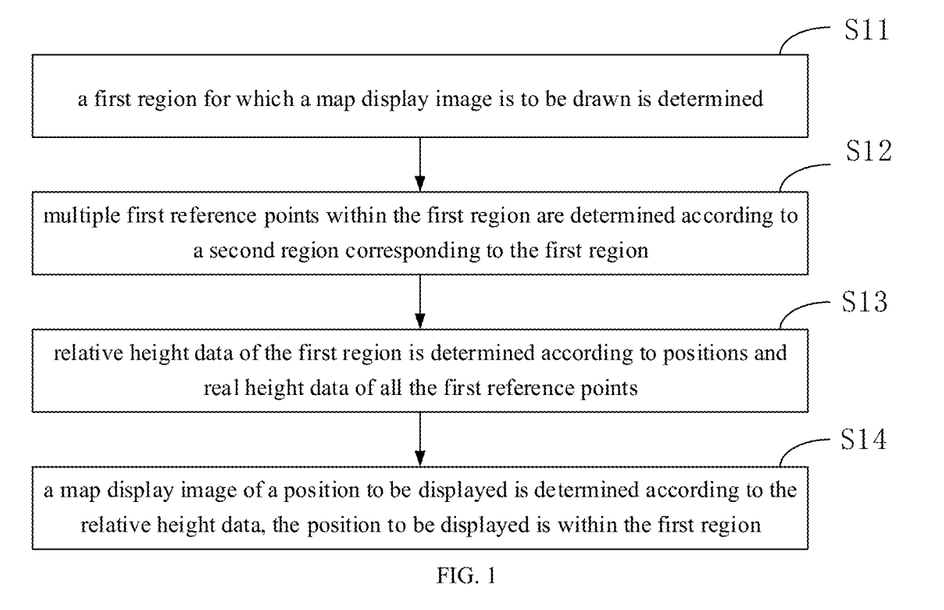
FIG. 1 is a flowchart of a method for processing map data according to an embodiment of the present disclosure.

According to embodiment of the present disclosure, there is provided a method for processing map data. FIG. 1 is a flowchart of a method for processing map data according to an embodiment of the present disclosure. This method can be applied to an electronic device that can use a front end or a segment to execute instructions, for example, the device can be deployed in a terminal or server or other processing device execution, and perform steps such as acquisition of the content of target information, determination of stability. The terminal can be user equipment (UE), mobile device, cellular phone, cordless phone, personal digital assistant (PDA), handheld device, computing device, on-board device, wearable device, vehicle remote control device, etc. In some possible implementations, the method can also be implemented by a processor calling computer-readable instructions stored in a memory. As illustrated in FIG. 1, the method for processing map data includes the following steps.

At block S11, a first region for which a map display image is to be drawn is determined.

At block S12, multiple first reference points within the first region are determined according to a second region corresponding to the first region.

At block S13, relative height data of the first region is determined according to positions and real height data of all the first reference points.

At block S14, a map display image of a position to be displayed is determined according to the relative height data, the position to be displayed is within the first region.

In this embodiment, the first region for which the map display image is to be drawn may be an real geographic range region. For example, it may be a city, county, district, or other administrative planning region.

The first region may also be a part of the area within the administrative planning region, and may include a part of two or more different administrative planning regions, which may be determined based on a specific position where a terminal that needs to display the map display image is located. For example, a certain area centered on the position of the terminal can be determined as the first region according to the specific position where the terminal of the map display image is located, and a predetermined range.

In an alternative implementation, a actual territory within a certain range can be divided, for example, the territory within a country is divided into a plurality of units, a target unit in which the terminal is located is determined based on position information of the terminal that needs to display the map display image, a set number of units around the target unit are determined, and the target unit and the set number of units around the target unit are determined as the first region.

In an alternative implementation, the first region can also be determined according to a data source. For example, in a case that a calculation of relative height data according to real height data, the first region can be determined according to the position of the terminal where the map display image needs to be displayed, in combination with a region having the real height data near the position of the terminal.

Specifically, for example, in an implementation, the determination of the relative height data is dependent on the real height values of at least a certain number of the first reference points within the first region, in a case that the terminal requiring the display of the map display image is in a target range and at least some of the points (the number of which is greater than the above certain number) within the target range have collected real height values, or the real height values of the at least some of the points within the target range can be obtained through other approaches, the first region may be determined according to the target range.

In an alternative implementation, the first region may be a region with substantially the same or similar height trend. For example, if an administrative planning region has mountainous terrain in the east part and plain terrain in the west part, the east part of the administrative planning region may be a first region and the west part may be another first region.

In this embodiment, determining the multiple first reference points within the first region according to the second region corresponding to the first region may include, determining the corresponding second region based on the first region, and determining a set number of multiple first reference points based on the second region.

The first reference point may be a point that actually exists, such as, a point of a roadway, a top point of a building, a corner point of a building, a point at the bottom of a bridge, and the like.

In an alternative implementation, the first region may be used as a second region, and a limited number of real position points with real height data in the first region may be used as the first reference points.

In this embodiment, the multiple first reference points are multiple points that can reflect a general change in terrain in the first region. Therefore, the multiple first reference points may be multiple points of unequal heights.

The position of the first reference point may be a positioning position of the first reference point. For example, the position obtained by positioning with a Global Positioning System (GPS) device.

In this embodiment, the real height data may be a specific height value of the first reference point, such as X meters above sea level, or data obtained by normalizing, unit conversion, or other processing of the real height data. For example, the value is obtained by normalizing the height value in the range of 0-9000 meters.

The relative height data of the first region may be relative height data of all points in the first region, or a calculation mode of relative height data of all points in the first region. The calculation mode may include calculating an expression, a calculating parameter of the expression, etc.

Determining the relative height data of the first region according to the positions and the real height data of all the first reference points may include determining the calculation mode of the relative height data within the first region according to the positions and the real height data of the first reference points, and determining the relative height data of the first region according to the calculation mode of the relative height data corresponding to the first region, such that the real height data of the first region cannot be obtained by backward induction of the relative height data at least without knowing the calculation mode. Thus, the secrecy of the real height data is realized, while the information required for the the return map display image is reflected, and the effect of secrecy of the real height data that needs to be kept secret without affecting the display effect is achieved.

In this embodiment, the position to be displayed may be determined according to a current position of the terminal that needs to present the map display image. For example, when the terminal is currently located at position A within the first region, the position A may be used as the position to be displayed.

In this embodiment, the relative height data may be height data virtualized according to the real height data, i.e., virtual height data.

Determining the map display image of the position to be displayed according to the relative height data may include determining a field of view according to the position to be displayed, and determining the map display image of the position to be displayed according to the relative height data corresponding to the field of view.

In another specific implementation, determining the map display image of the position to be displayed according to the relative height data may further include determining the field of view according to the position to be displayed and a display type, and determining the map display image of the position to be displayed according to the relative height data corresponding to the field of view. The display type may include at least one of a display device type, a display device mode type. The display device can be specifically a general mobile communication terminal, on-board terminal, etc. The display device mode type may be, for example, a walking mode, a driving mode, etc.

In this embodiment, the relative height data of the first region is determined according to the positions and the real height data of the first reference points within the first region, and the map display image of the position to be displayed is determined according to the relative height data within the first region, so that the real height data within the first region is not reflected in the map display image and the purpose of the secrecy of the real height data is achieved.

In an implementation, determining the relative height data of the first region according to the positions and the real height data of all the first reference points includes: determining relative a height data generation parameter corresponding to the first region according to the positions and the real height data of all the first reference points; and determining the relative height data according to the relative height data generation parameter.

In this embodiment, the relative height data generation parameter may be a parameter specifically used in the calculation when the relative height is calculated with an established mode.

In an alternative implementation, before determining the relative height data generation parameter, one of multiple given relative height data generation modes may be selected, and then the corresponding relative height data generation parameter may be determined.

Determining the relative height data according to the relative height data generation parameter may include determining a relative height data expression of the first region according to the relative height data generation parameter, the relative height data expression is used to combine with specific latitude and longitude information or coordinate information of the world coordinate system of the position point of the first region, to obtain the relative height data.

In this embodiment, the relative height data generation parameter is determined by the position and the real height data of the first reference point, so that the relative height data corresponding to the first region can serve the purpose of satisfying the display while keeping the real height data confidential.

Figure 2:
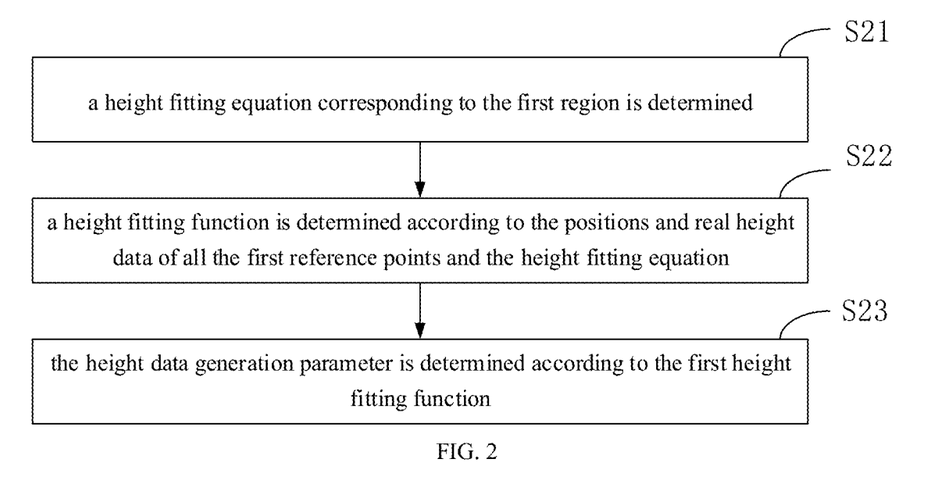
FIG. 2 is a flowchart of a method for processing map data according to another embodiment of the present disclosure.

In an implementation, as illustrated in FIG. 2, determining the relative height data generation parameter according to the positions and the real height data of all the first reference points includes the following steps.

At block S21, a height fitting equation corresponding to the first region is determined.

At block S22, a height fitting function is determined according to the positions and real height data of all the first reference points and the height fitting equation.

At block S23, the height data generation parameter is determined according to the first height fitting function.

In this embodiment, the height fitting equation corresponding to the first region may be an equation with the longitude and latitude information of the first region as the independent variables, the height as the dependent variable, and the parameter as the unknowns. Since a certain number of first reference points in the first region have the corresponding real height data and position information, and the position information may contain longitude and latitude, the first height fitting function with the real height data of the first region as the dependent variable and longitude and latitude as the independent variables can be determined according to the positions of the first reference points, the real height data and the height fitting equation.

In an alternative implementation, the coordinate values of the first reference point in the world coordinate system can be used instead of the above mentioned longitude and latitude.

Determining the height data generation parameter according to the first height fitting function may include determining a parameter of the first height fitting function as the height data generation parameter. In a case that the height fitting equation expression is not uniquely set in advance, the height fitting equation expression may be used as additional information for the height data generation parameter when determining the height data generation parameter.

Due to the complex variation of the real height values in a region, there is generally a significant difference between the fitted height fitting function and the trend of the real height data variation, such that the real height data is not leaked through the first height fitting function, and at the same time, since the first height fitting function is fitted through the real height data at the first reference point, the first height fitting function is able to largely reflect the height variation trend in the first region and provide more accurate relative height information to meet the display requirement of the map display image.

In an implementation, the height fitting equation is a multiple polynomial equation or a B-spline surface equation, the position of the first reference point includes longitude and latitude of the first reference point.

In this embodiment, the multiple polynomial equation may be a quadratic polynomial equation, a cubic polynomial equation, a quartic polynomial equation, etc. The independent variable of the equation may include longitude and latitude, or include x-coordinate and y-coordinate in the world coordinate system.

The B-spline surface can be a surface constructed by linearly combining a control vertex grid with the tensor product of B-spline basis function as a weighting factor. The B-spline surface equation can be an equation expressing a B-spline surface.

In an alternative implementation, the B-spline surface equation may also be replaced by other spline surfaces.

In this embodiment, the multiple polynomial equation and the B-spline surface equation enable the real height data to be displayed without being disclosed while meeting the accuracy requirements of the display.

Figure 3:
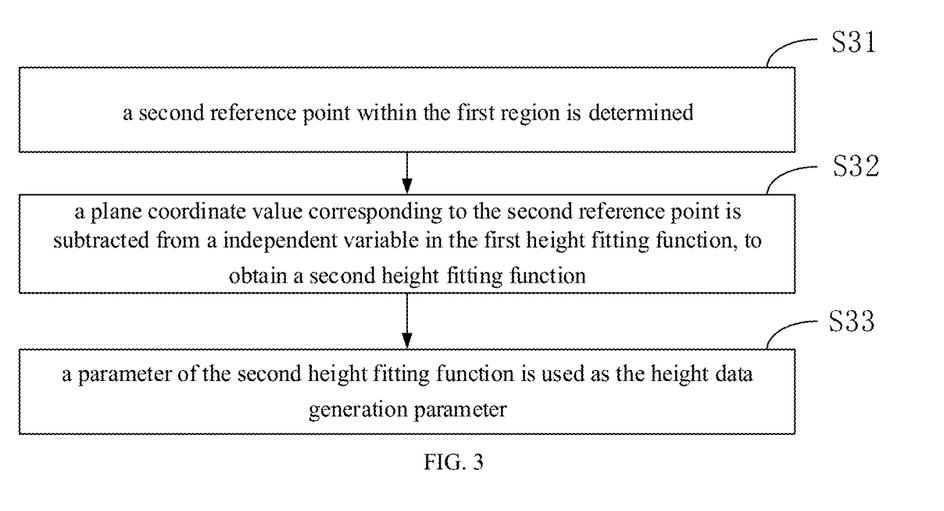
FIG. 3 is a flowchart of a method for processing map data according to yet another embodiment of the present disclosure.

In a real-time manner, as illustrated in FIG. 3, determining the height data generation parameter according to the first height fitting function includes the following steps.

At block S31, a second reference point within the first region is determined.

At block S32, a plane coordinate value corresponding to the second reference point is subtracted from a independent variable in the first height fitting function, to obtain a second height fitting function; and At block S33, a parameter of the second height fitting function is used as the height data generation parameter.

The second reference point in the first region may be another reference point in the first region that is different from the first reference point.

In an alternative implementation, the second reference point is a point within the first region that is different from the first reference point and that has real height data.

Subtracting the position corresponding to the second reference point from the independent variable in the first height fitting function may include subtracting the position corresponding to the second reference point from a part of the independent variable corresponding to the position.

In the actual calculation, since the real longitude and latitude data values are large, when the real longitude and latitude data are used to calculate the relative height data, a large jump is likely to occur, which affects the display effect, so the position corresponding to the second reference point is subtracted from the independent variable in the first height fitting function to ensure the smoothness of the data calculation.

In an implementation, in a case that in a case that there are multiple second regions, determining the multiple first reference points within the first region according to the second region corresponding to the first region includes: determining the multiple second regions within the first region according to the first region and a preset second region division rule; and determining a first reference point within each of the second regions according to a preset first reference point selection rule, to obtain the multiple first reference points.

In this embodiment, the second regions may be included within the first regions.

The second region may be determined based on representative position points within the first region. The areas and shapes of the multiple second regions may also be different. For example, when a lots of sections within the first region are approximately equal in height except for a representative building, the region where the representative building is located and the region outside the representative building may be used as two different second regions within the first region.

The second region may also be determined based on geographical characteristics of the first region. For example, when the first region is high in the east and low in the west, the multiple second regions can be automatically determined to the west. Again, when the height of the middle position of the first region is lower than the height of the edge position, the middle position may be used as one second region and the edge position may be used as another second region. Again, when a part of the first region has complex terrain changes and another part is more regular, the region with relatively complex terrain changes may be used as one or more second regions, and the region with relatively regular terrain changes may be used as another second region.

Determining the first reference point within each second region according to the predetermined first reference point selection rule may include determining at least one first reference point in each second region.

In a possible implementation, for different second regions, the manner for determining the first reference points and the number of first reference points can be different. For example, for the second region with more regular changes in height (terrain), the first reference points may be selected uniformly, and for the second regions with more irregular changes in height, multiple representative first reference points may be selected.

In this embodiment, from multiple second regions included in the first region, a first reference point for each second region is selected, thereby enabling the height change trend of the first region to be determined based on the multiple first reference points, which contributes to obtain the relative height data required for display.

In an implementation, the preset region division rule includes at least one of area rule and shape rule.

In a possible implementation, the multiple second regions may be determined according to equal area and equal shape.

The region division rule may specifically include the area size and shape of the region division. For example, the region is divided into multiple square regions according to an N×N specification, to obtain the second regions.

In an alternative implementation, the predetermined region division rule may also include a number of second regions.

In this embodiment, the second regions are determined according to at least one of the predetermined area rule and shape rule, enabling simplified operation and reducing the time taken up by the second region division process.

Figure 4:
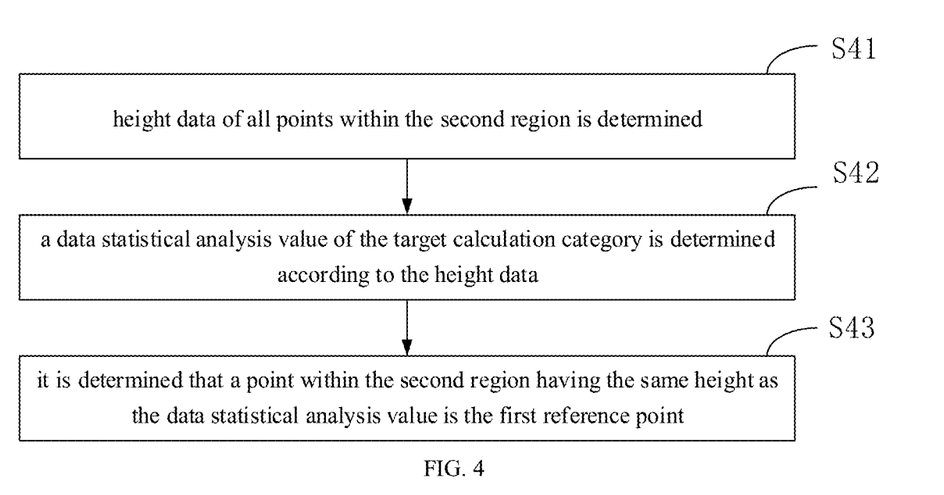
FIG. 4 is a flowchart of a method for processing map data according to yet another embodiment of the present disclosure.

In an implementation, in a case that the preset first reference point selection rule includes a target calculation category of data statistical analysis, determining the first reference point within each of the second regions according to the preset first reference point selection rule includes the following steps.

At block S41, height data of all points within the second region is determined.

At block S42, a data statistical analysis value of the target calculation category is determined according to the height data.

At block S43, it is determined that a point within the second region having the same height as the data statistical analysis value is the first reference point.

All points within the second region may be infinite position points or finite position points approximating infinite position points.

In this embodiment, the target calculated category of data statistical analysis may be at least one of a median value, a maximum value, a minimum value, a mean value, a variance value, a standard deviation value, etc. The data statistical analysis value of the target calculation category may be a specific value of the median value, the maximum value, the minimum value, the mean value, the variance value, the standard deviation value.

In a possible implementation, all second regions within the first region have the same target calculation category. That is, when the target calculation category of statistical analysis of one of the second regions is the maximum value, the target calculation category of statistical analysis of the other second regions is also the maximum value.

In this embodiment, the first reference point is determined by the data statistical analysis value of the target calculation category, so that the height variation within the first region can be reflected by a limited number of first reference points.

In an embodiment, determining the map display image of the position to be displayed according to the relative height data includes: determining a display height according to the relative height data of the position to be displayed; and determining the map display image according to the display height.

Determining the display height according to the relative height data of the position to be displayed may include using the relative height data as the display height.

Determining the map display image according to the display height may include determining the display image according to the relative height of the position to be displayed and other information within the field of view, in combination with the current scale.

In this embodiment, the display height in the map display image is determined according to the relative height data, so that the real height information can be hidden in the map display image for the purpose of keeping the actual height data confidential.

Figure 5:
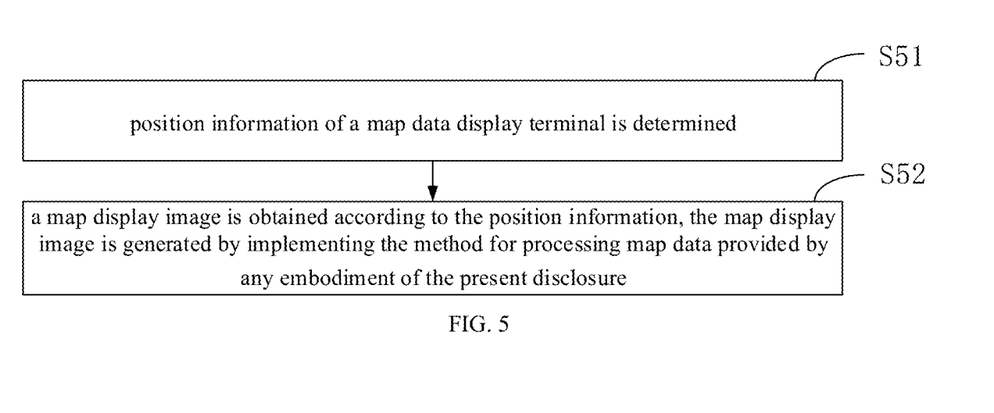
FIG. 5 is a flowchart of a method for processing map data according to yet another embodiment of the present disclosure.

According to embodiments of the present disclosure, there is further provided a method for processing map data, as illustrated in FIG. 5, the method includes the following steps.

At block S51, position information of a map data display terminal is determined.

At block S52, a map display image is obtained according to the position information, the map display image is generated by implementing the method for processing map data provided by any embodiment of the present disclosure.

In this embodiment, the map data display terminal may include at least one of a mobile communication terminal such as a cell phone, a laptop computer, a tablet computer, a wearable mobile device, an on-board computer, and other terminals. The position information of the map data display terminal may be determined by a positioning system.

In this embodiment, the map display image may be generated in advance, for example, map display image data corresponding to each real position is generated in advance in the cloud, and the map display image data may be sent down to the terminal to realize screen rendering when the map data display terminal requests it. It is also possible to calculate relative height data in real time when the map data display terminal is at a specific position, and use the relative height data to generate the map display image.

In the present embodiment, the image displayed at the map data display terminal is generated using the relative height data, thereby not revealing the real height data that needs to be kept confidential, and at the same time satisfying the requirements for the image authenticity during navigation, presenting the relative height information that needs to be presented to the end user, and improving the map data display effect.

Figure 6:
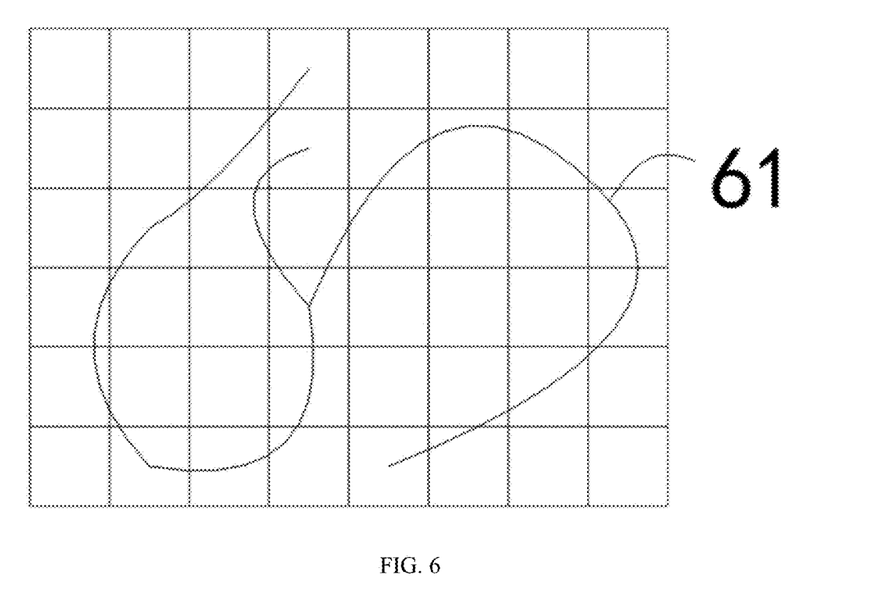
FIG. 6 is a schematic diagram of a square grid division according to an example of the present disclosure.
Figure 7:
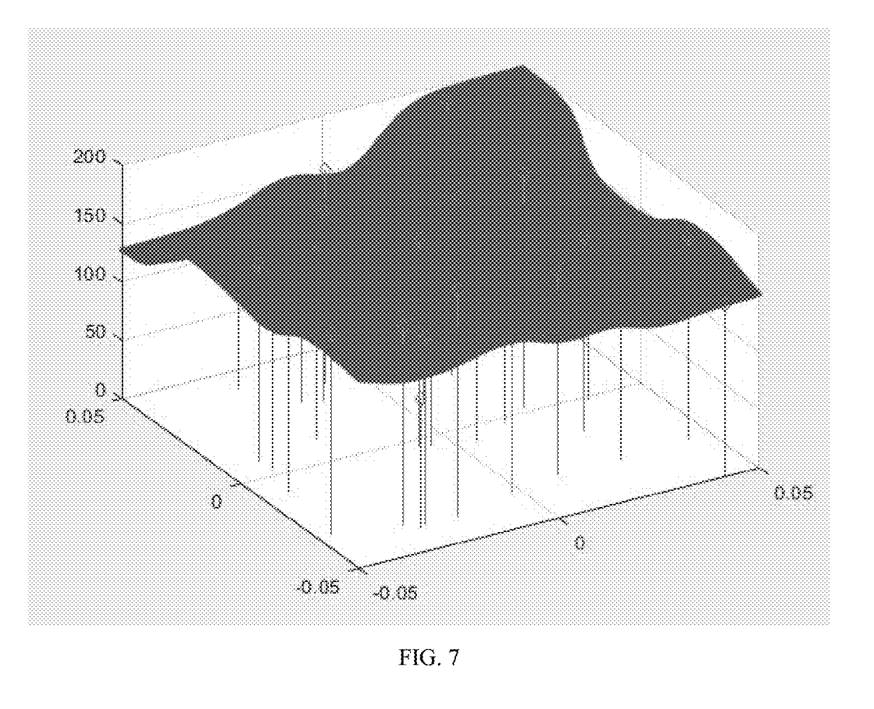
FIG. 7 is a schematic diagram of a surface fitting according to an example of the present disclosure.

In an example of the present disclosure, a method for processing map data includes: determining 16 (or other number of) 500 m×500 m (or other length and width values) squares; searching a typical height value within each 500 m×500 m square as a height value for a first reference point; the squares and the typical height value correspond to the first reference point are shown in FIG. 6, and the regions in the squares may include at least one road 61; fitting a polynomial plane according to the typical height value, to obtain a virtual terrain value, the polynomial plane is shown in FIG. 7; and subtracting the corresponding virtual terrain value from the raw elevation value of each point within the fitted range to obtain the virtual elevation (i.e., the relative height data of the preceding embodiments).

Figure 8:
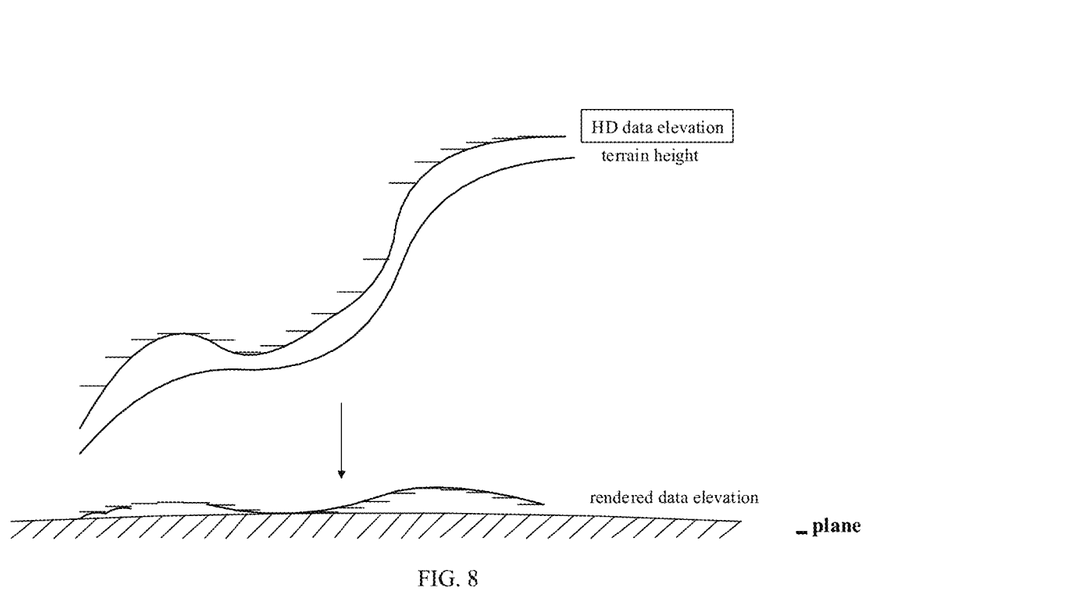
FIG. 8 is a schematic diagram of a relative height data calculation according to an example of the present disclosure.

In a specific example, the original elevation value may be obtained from high-definition (HD) map data. As illustrated in FIG. 8, the terrain height of the fitted polynomial plane is subtracted from the original elevation value obtained from the HD map data, i.e., the HD elevation, to obtain a rendered data elevation (i.e., the relative height data of the preceding embodiments).

In an example of the present disclosure, the virtual height may be fitted in a variety of ways, for example, the polynomial plane and the B-sample surface may be fitted.

For the polynomial plane, the 2nd polynomial plane may be chosen, the equation is:

$$f(x,y)=ax^2+by^2+cxy+dx+ey+f$$

where x and y represent the corresponding latitude and longitude. In practice, a 3rd polynomial or a higher order can be chosen.

Specifically, the details of the polynomial fitting approach are as follows (for a quadratic surface).

The expression of the quadratic surface equation is:

$$f(x,y)=ax^2+by^2+cxy+dx+ey+f$$

Considering the concentrated values of latitude and longitude, they are processed after subtracting an offset. The offset is chosen as a city center point, corresponding to the latitude and longitude $(x_0, y_0)$ and the elevation value $h_0$.

The corresponding elevation difference $\Delta h$ for each latitude and longitude point can be expressed as:

$$\text{Let } \begin{cases} \Delta x_i = x_i - x_0 \\ \Delta y_i = y_i - y_0 \end{cases}; \Delta h_i = h_i - h_0$$

$\Delta h_i$ denotes the elevation difference value of the ith point, and $(\Delta x_i, \Delta y_i)$ denotes the coordinate value difference of the ith point. The surface fitting equation is expressed in matrix form expanded as follows:

$$\begin{bmatrix} \Delta x_1^2 & \Delta y_1^2 & \Delta x_1 \Delta y_1 & \Delta x_1 & \Delta y_1 & 1 \\ \Delta x_2^2 & \Delta y_2^2 & \Delta x_2 \Delta y_2 & \Delta x_2 & \Delta y_2 & 1 \\ \Delta x_3^2 & \Delta y_3^2 & \Delta x_3 \Delta y_3 & \Delta x_3 & \Delta y_3 & 1 \\ \vdots & \vdots & \vdots & \vdots & \vdots & \vdots \\ \Delta x_{n-1}^2 & \Delta y_{n-1}^2 & \Delta x_{n-1} \Delta y_{n-1} & \Delta x_{n-1} & \Delta y_{n-1} & 1 \\ \Delta x_n^2 & \Delta y_n^2 & \Delta x_n \Delta y_n & \Delta x_n & \Delta y_n & 1 \end{bmatrix} \begin{bmatrix} a \\ b \\ c \\ d \\ e \\ f \end{bmatrix} = \begin{bmatrix} \Delta h_1 \\ \Delta h_2 \\ \Delta h_3 \\ \vdots \\ \Delta h_{n-1} \\ \Delta h_n \end{bmatrix}$$

In the above matrix, the unknowns are a, b, c, d, e, and f.

The expression can be written in the form of matrix multiplication: Ax=b.

Solve for:

$$x=(A^T A)^- A^T b$$

When it is used, by substituting the latitude and longitude, and the city center point and height data $(x_0, y_0, h_0)$ into the following equation, and the corresponding virtual terrain elevation values (i.e., the relative height data of the previous embodiments) can be returned based on the a, b, c, d, e, and f obtained by solution:

$$\Delta h(x,y)=a(x-x_0)^2+b(y-y_0)^2+c(x-x_0)(y-y_0)+d(x-x_0)+e(y-y_0)+f+h_0.$$

For practical use, the corresponding fitted virtual terrain f(x, y) is subtracted from the real elevation of each point obtained from the HD, to obtain the virtual elevation data. At the same time, since $f+h_0$ in the equation is a value containing a constant f, $h_0$ can still be kept confidential for the terminal or user who needs a map display image.

In the calculation of the polynomial plane, each point is fitted to the plane with the points in the surrounding 5×5 (or other number) squares.

Figure 9A:
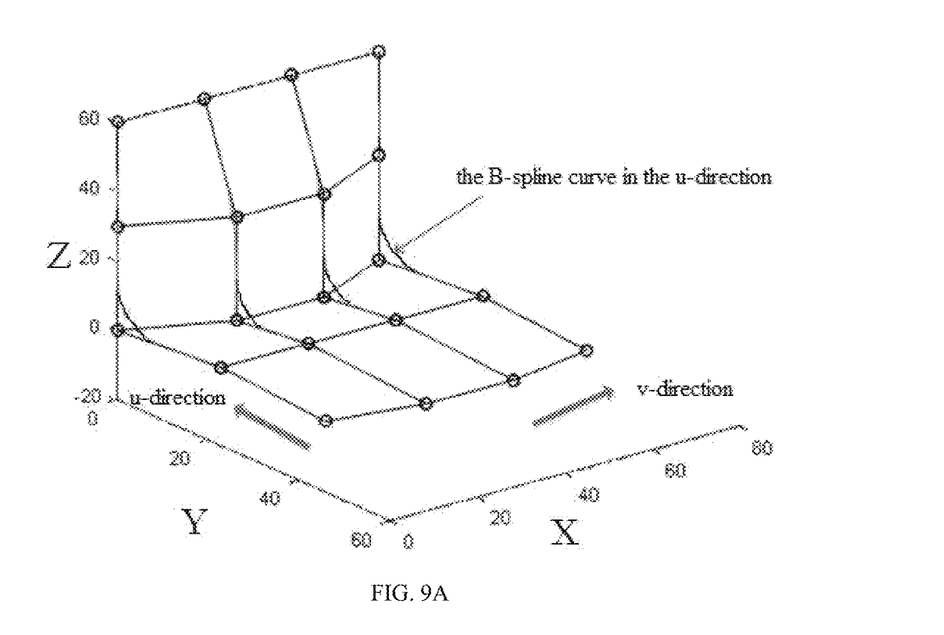
FIGS. 9A-9D are schematic diagrams of a B-spline surface fitting according to an example of the present disclosure.
Figure 9B:
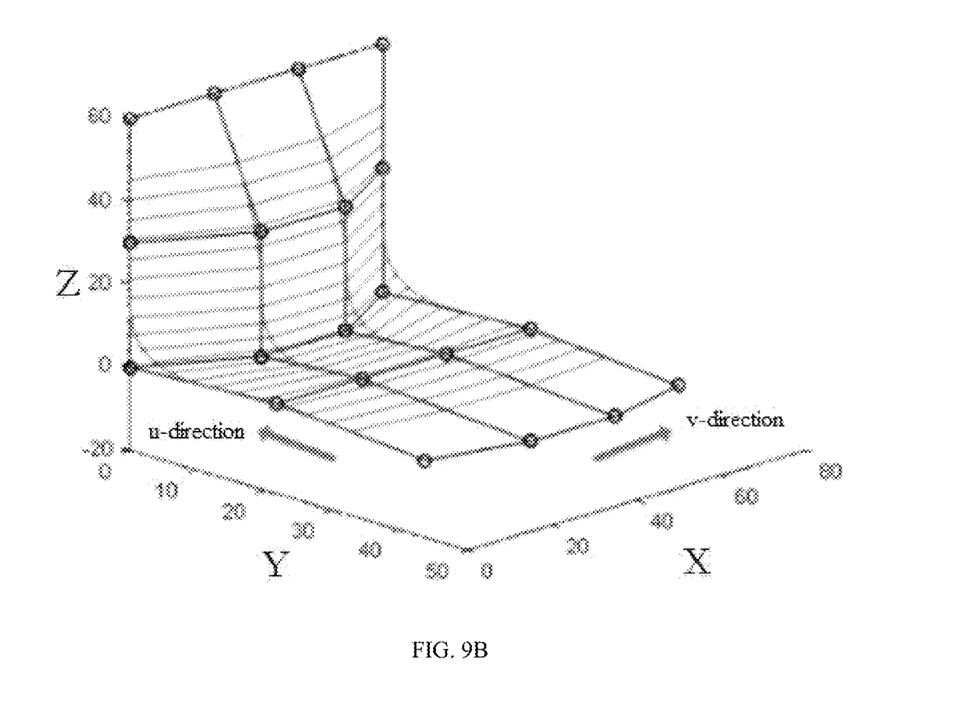
Figure 9C:
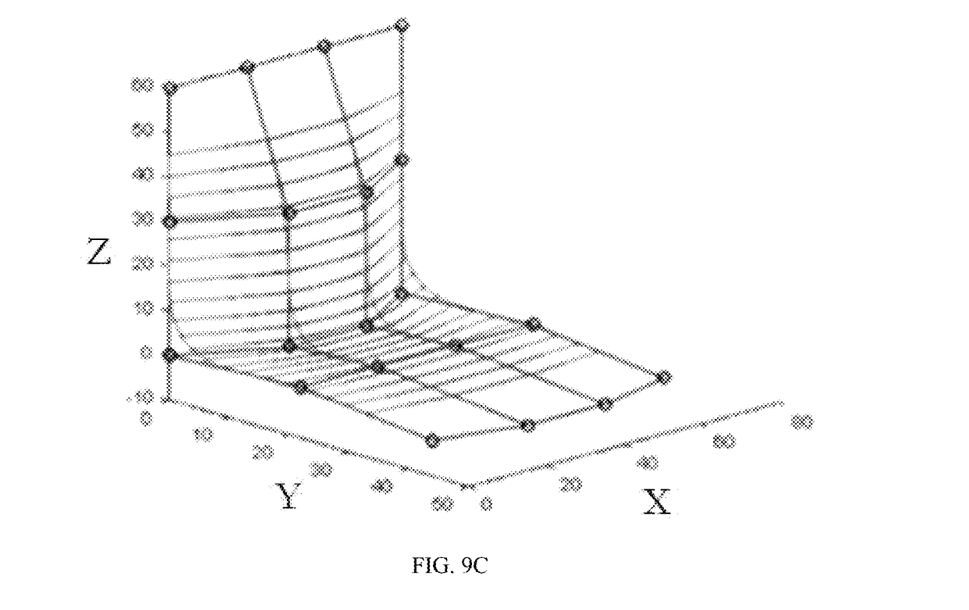
Figure 9D:
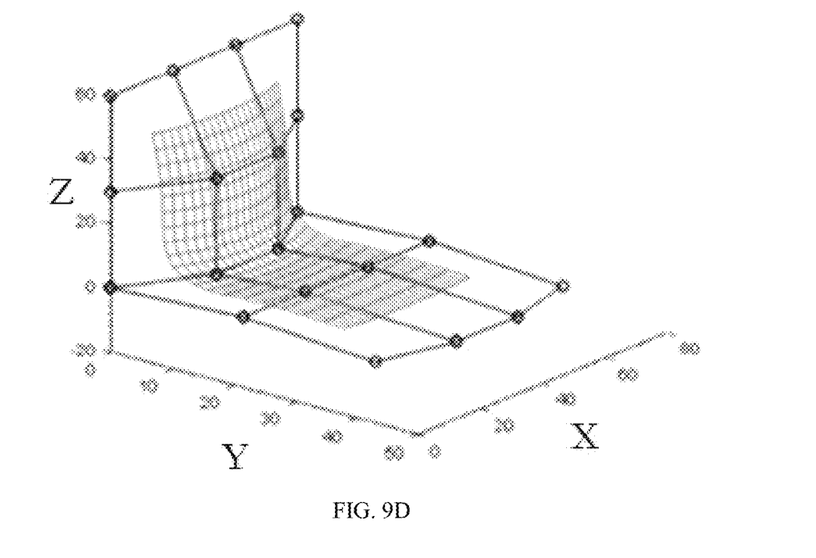

For the B-spline surface, either quadratic or cubic B-spline surfaces can be used. First, according to the definition, the B-spline curve in the u-direction is generated, as shown in FIGS. 9A-9C, and the v-direction control points are uniformly sampled to obtain the result in the v-direction, as shown in FIG. 9D. The curve thus obtained is the line on the B-spline surface, u and v are the parameters of the B-spline surface.

Figure 10A:
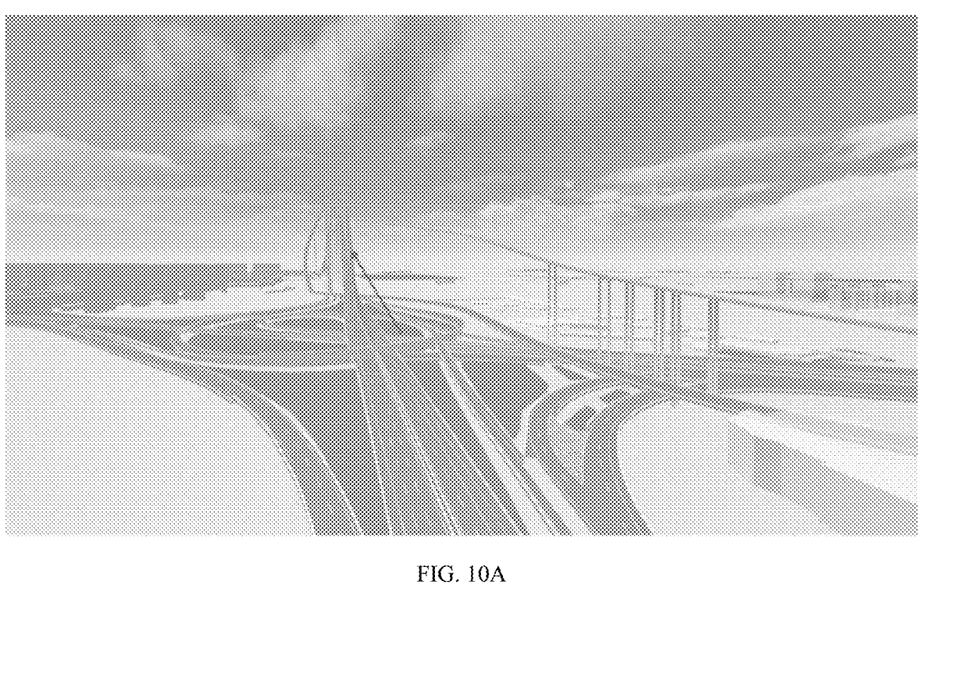
FIG. 10A is a schematic diagram of a display image obtained without using a method for processing map data provided by embodiments of the present disclosure.
Figure 10B:
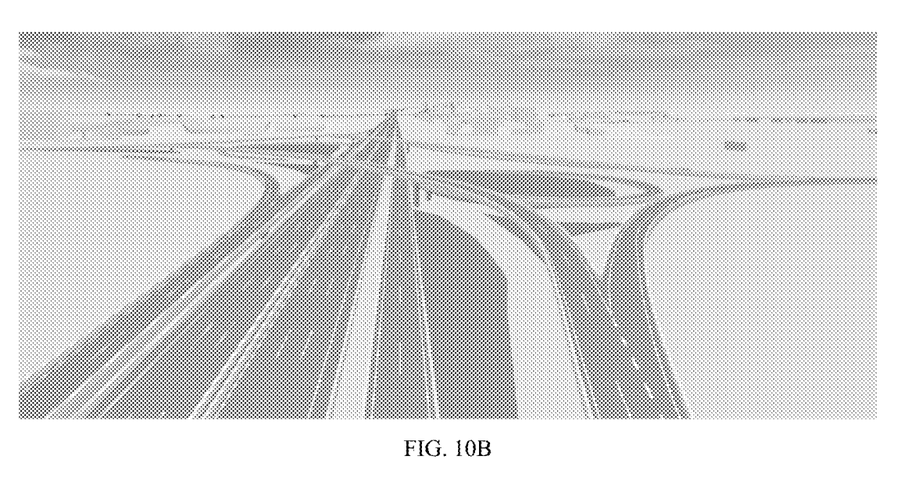
FIG. 10B is a schematic diagram of a map display image obtained with using a method for processing map data provided by embodiments of the present disclosure.

When the processing is not performed by the method of examples of the present disclosure, there may be low smoothness in some connection places of the road network and unreasonable rendering of the road surface, as shown in FIG. 10A. After the virtual elevation processing, the elevation data of the real road cannot be obtained for the purpose of confidentiality, while the roads are relatively smooth and the rendering data are reasonable and better, as shown in FIG. 10B.

Figure 11:
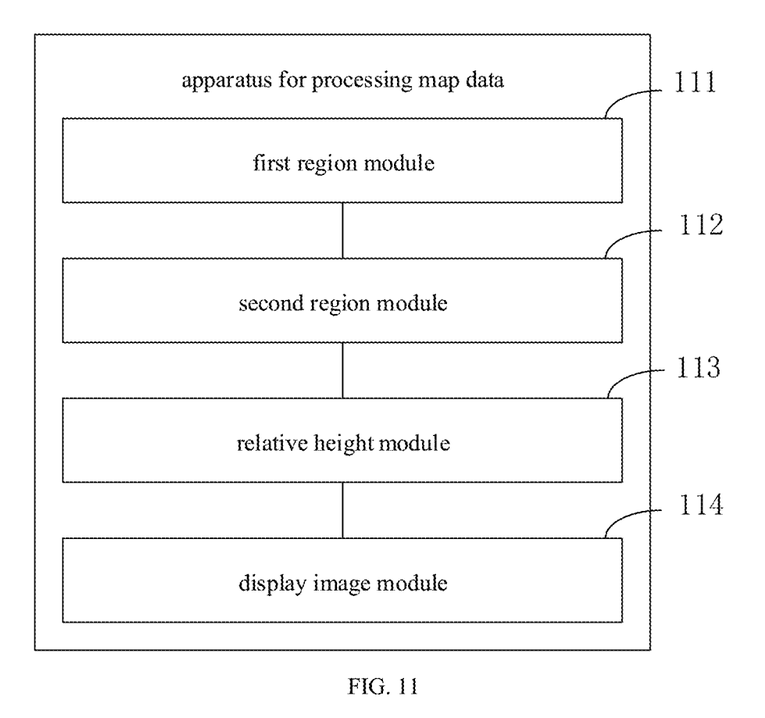
FIG. 11 is a block diagram of an apparatus for processing map data according to an embodiment of the present disclosure.

According to embodiments of the present disclosure, there is also provided an apparatus for processing map data, as illustrated in FIG. 11, the apparatus includes a first region module 111, a second region module 112, a relative height module 113, and a display image module 114.

The first region module 111 is configured to determine a first region for which a map display image is to be drawn.

The second region module 112 is configured to determine multiple first reference points within the first region according to a second region corresponding to the first region.

The relative height module 113 is configured to determine relative height data of the first region according to positions and real height data of all the first reference points.

The display image module 114 is configured to determine a map display image of a position to be displayed according to the relative height data. The position to be displayed is within the first region.

Figure 12:
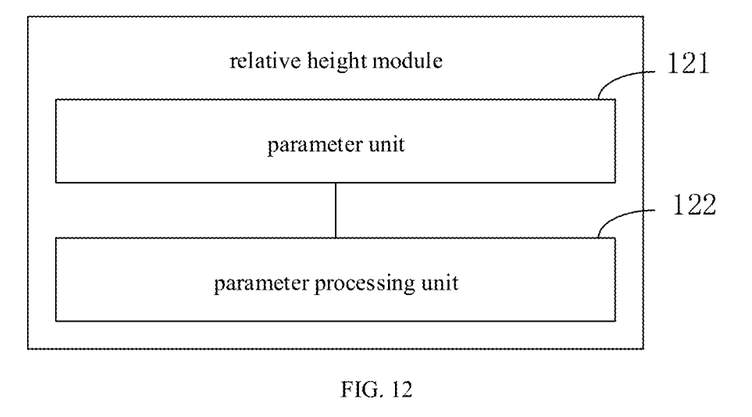
FIG. 12 is a block diagram of an apparatus for processing map data according to another embodiment of the present disclosure.

In an implementation, as illustrated in FIG. 12, the relative height module includes a parameter unit 121 and a parameter processing unit 122.

The parameter unit 121 is configured to determine a relative height data generation parameter corresponding to the first region according to the positions and the real height data of all the first reference points; and The parameter processing unit 122 is configured to determine the relative height data according to the relative height data generation parameter.

In an implementation, the parameter unit is further configured to: determine a height fitting equation corresponding to the first region; determine a height fitting function according to the positions and real height data of all the first reference points and the height fitting equation; and determine the height data generation parameter according to the first height fitting function.

In an implementation, the height fitting equation is a multiple polynomial equation or a B-spline surface equation, and the position of the first reference point includes longitude and latitude of the first reference point.

In an implementation, the parameter unit is further configured to: determine a second reference point within the first region; subtract a position corresponding to the second reference point from a independent variable in the first height fitting function, to obtain a second height fitting function; and use a parameter of the second height fitting function as the height data generation parameter.

Figure 13:
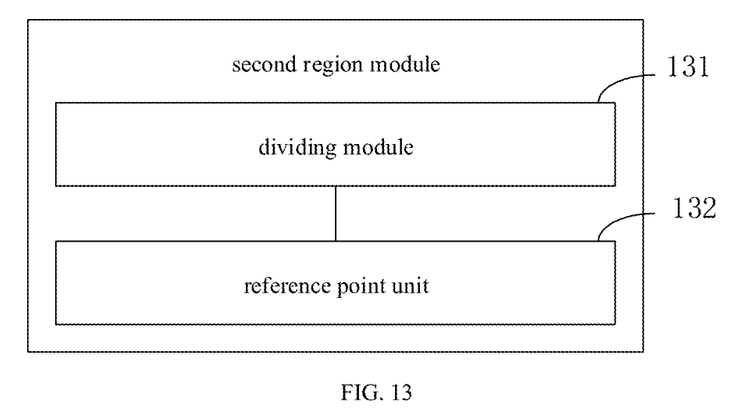
FIG. 13 is a block diagram of an apparatus for processing map data according to yet another embodiment of the present disclosure.

In an implementation, as illustrated in FIG. 13, in a case that there are multiple second regions, the second region module includes a dividing module 131 and a reference point unit 132.

The dividing module 131 is configured to determine the multiple second regions within the first region according to the first region and a preset second region division rule; and The reference point unit 132 is configured to determine a first reference point within each of the second regions according to a preset first reference point selection rule, to obtain the multiple first reference points.

In an implementation, the preset region division rule includes at least one of area rule and shape rule.

In an implementation, in a case that the preset first reference point selection rule includes a target calculation category of data statistical analysis, the reference point unit is further configured to: determine height data of all points within the second region; determine a data statistical analysis value of the target calculation category according to the height data; and determine that a point within the second region having the same height as the data statistical analysis value is the first reference point.

Figure 14:
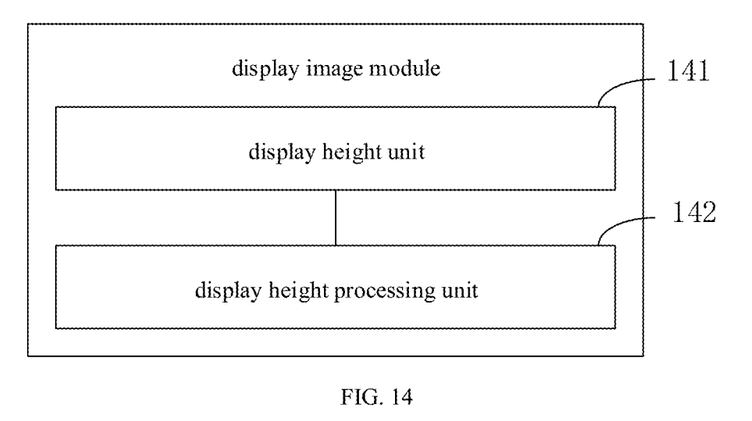
FIG. 14 is a block diagram of an apparatus for processing map data according to yet another embodiment of the present disclosure.

In an implementation, as illustrated in FIG. 14, the display image module includes a display height unit 141 and a display height processing unit 142.

The display height unit 141 is configured to determine a display height according to the real height data of the position to be displayed and the relative height data of the position to be displayed.

The display height processing unit 142 is configured to determine the map display image according to the display height.

Figure 15:
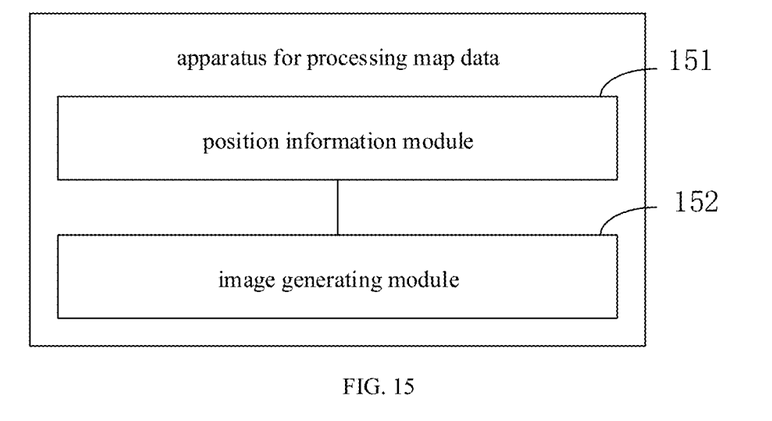
FIG. 15 is a block diagram of an apparatus for processing map data according to yet another embodiment of the present disclosure.

According to embodiments of the present disclosure, there is also provided an apparatus for processing map data, as illustrated in FIG. 15, the apparatus includes a position information module 151 and a image generating module 152.

The position information module 151 is configured to determine position information of a map data display terminal;

The image generating module 152 is configured to obtain a map display image according to the position information, the map display image is generated by the apparatus for processing map data provided by any embodiment of the present disclosure.

In the technical scheme of the present disclosure, the collection, storage, and application of the personal information of the users involved are in conformity with relevant laws and regulations, and are not in violation of public order and good customs.

According to embodiments of the present disclosure, the present disclosure also provides an electronic device, a readable storage medium and a computer program product.

Figure 16:
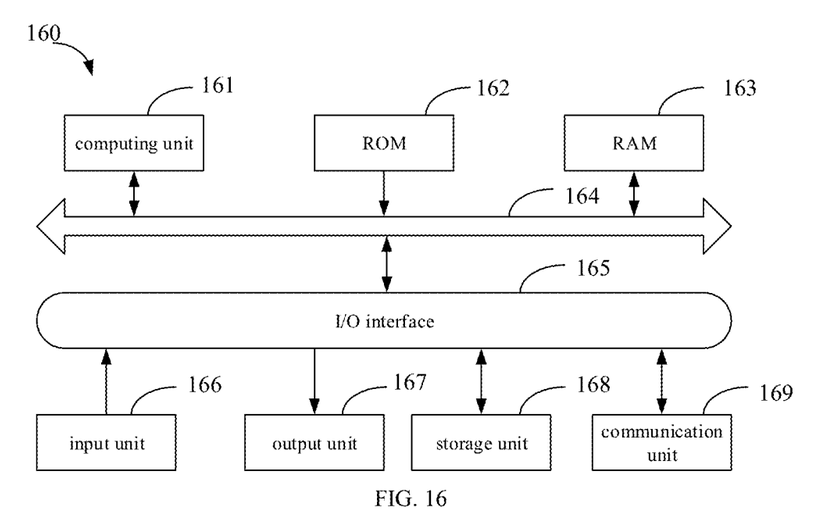
FIG. 16 is a block diagram of an electronic device for implementing a method for processing map data of embodiments of the present disclosure.

FIG. 16 is a block diagram of an example electronic device 160 used to implement embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the present disclosure described and/or required herein.

As illustrated in FIG. 16, the device 160 includes a computing unit 161 performing various appropriate actions and processes based on computer programs stored in a read-only memory (ROM) 162 or computer programs loaded from the storage unit 168 to a random access memory (RAM) 163. In the RAM 163, various programs and data required for the operation of the device 160 are stored. The computing unit 161, the ROM 162, and the RAM 163 are connected to each other through a bus 164. An input/output (I/O) interface 165 is also connected to the bus 164.

Components in the device 160 are connected to the I/O interface 165, including: an input unit 166, such as a keyboard, a mouse; an output unit 167, such as various types of displays, speakers; a storage unit 168, such as a disk, an optical disk; and a communication unit 169, such as network cards, modems, and wireless communication transceivers. The communication unit 169 allows the device 160 to exchange information/data with other devices through a computer network such as the Internet and/or various telecommunication networks.

The computing unit 161 may be various general-purpose and/or dedicated processing components with processing and computing capabilities. Some examples of computing unit 161 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 161 executes the various methods and processes described above, such as the method for fusing road data to generate a map. For example, in some embodiments, the method for fusing road data to generate a map may be implemented as a computer software program, which is tangibly contained in a machine-readable medium, such as the storage unit 168. In some embodiments, part or all of the computer program may be loaded and/or installed on the device 160 via the ROM 162 and/or the communication unit 169. When the computer program is loaded on the RAM 163 and executed by the computing unit 161, one or more steps of the method described above may be executed. Alternatively, in other embodiments, the computing unit 161 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or their combination. These various implementations may be realized in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the present disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor) for displaying information to a user; and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or includes such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of distributed system or a server combined with block-chain.

It should be understood that the various forms of processes shown above can be used to reorder, add or delete steps. For example, the steps described in the present disclosure could be performed in parallel, sequentially, or in a different order, as long as the desired result of the technical solution disclosed in the present disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for processing map data, comprising:
    determining a first region for which a map display image is to be drawn;
    determining multiple first reference points within the first region according to a second region corresponding to the first region, wherein the first region is used as a second region or comprises multiple second regions;
    determining relative height data of the first region according to positions and real height data of all the first reference points; and
    determining a map display image of a position to be displayed according to the relative height data, wherein the position to be displayed is within the first region;
    wherein determining the relative height data corresponding to the first region according to the positions and the real height data of all the first reference points comprises:
    determining a height fitting equation corresponding to the first region;
    determining a first height fitting function according to the positions and real height data of all the first reference points and the height fitting equation, wherein the positions are independent variables of the first height fitting function and the real height data are dependent variables of the first height fitting function;
    determining a second reference point within the first region;
    subtracting a position corresponding to the second reference point from an independent variable in the first height fitting function to obtain a second height fitting function;
    using a parameter of the second height fitting function as a relative height data generation parameter corresponding to the first region; and
    determining the relative height data according to the relative height data generation parameter;
    wherein determining the map display image of the position to be displayed according to the relative height data comprises:
    determining a display height according to the real height data of the position to be displayed and the relative height data of the position to be displayed; and
    determining the map display image according to the display height.

2. The method according to claim 1, wherein the height fitting equation is a multiple polynomial equation or a B-spline surface equation, and the position of the first reference point comprises longitude and latitude of the first reference point.

3. The method according to claim 1, wherein, in a case that there are multiple second regions, determining the multiple first reference points within the first region according to the second region corresponding to the first region comprises:

determining the multiple second regions within the first region based on representative position points within the first region or geographical characteristics of the first region; and
determining a first reference point within each of the second regions according to a preset first reference point selection rule, to obtain the multiple first reference points.

4. The method according to claim 3, wherein the multiple second regions are further determined according to area sizes and shapes determined for respective second regions.

5. The method according to claim 3, wherein, in a case that the preset first reference point selection rule comprises a target calculation category of data statistical analysis, determining the first reference point within each of the second regions according to the preset first reference point selection rule comprises:
    determining height data of all points within the second region;
    determining a data statistical analysis value of the target calculation category according to the height data; and
    determining that a point within the second region having the same height as the data statistical analysis value is the first reference point wherein the target calculation category of statistical analysis is at least one of a median value, a maximum value, a minimum value, a mean value, a variance value, a standard deviation value, and the data statistical analysis value is a value corresponding to the target calculation category of data statistical analysis.

6. The method according to claim 1, wherein in a case that the method is performed by a map data display terminal, the method further comprises:
    determining position information of the map data display terminal.

7. An electronic device, comprising:
    at least one processor; and
    a memory communicatively coupled to the at least one processor;
    wherein the at least one processor is configured to:
    determine a first region for which a map display image is to be drawn;
    determine multiple first reference points within the first region according to a second region corresponding to the first region, wherein the first region is used as a second region or comprises multiple second regions;
    determine a height fitting equation corresponding to the first region;
    determine a first height fitting function according to positions and real height data of all the first reference points and the height fitting equation, wherein the positions are independent variables of the first height fitting function and the real height data are dependent variables of the first height fitting function;
    determine a second reference point within the first region;
    subtract a position corresponding to the second reference point from an independent variable in the first height fitting function to obtain a second height fitting function;
    use a parameter of the second height fitting function as a relative height data generation parameter corresponding to the first region;
    determine the relative height data according to the relative height data generation parameter;
    determining a display height according to the real height data of a position to be displayed and the relative height data of the position to be displayed; and determining a map display image according to the display height.

8. The electronic device according to claim 7, wherein the height fitting equation is a multiple polynomial equation or a B-spline surface equation, and the position of the first reference point comprises longitude and latitude of the first reference point.

9. The electronic device according to claim 8, wherein the at least one processor is further configured to:
   determine a second reference point within the first region;
   subtract a position corresponding to the second reference point from a independent variable in the first height fitting function, to obtain a second height fitting function; and
   use a parameter of the second height fitting function as the height data generation parameter.

10. The electronic device according to claim 7, wherein, in a case that there are multiple second regions, the at least one processor is further configured to:
    determine the multiple second regions within the first region based on representative position points within the first region or geographical characteristics of the first region; and
    determine a first reference point within each of the second regions according to a preset first reference point selection rule, to obtain the multiple first reference points.

11. The electronic device according to claim 10, wherein the multiple second regions are further determined according to area sizes and shapes determined for respective second regions.

12. The electronic device according to claim 10, wherein, in a case that the preset first reference point selection rule comprises a target calculation category of data statistical analysis, the at least one processor is further configured to:
    determine height data of all points within the second region;
    determine a data statistical analysis value of the target calculation category according to the height data; and
    determine that a point within the second region having the same height as the data statistical analysis value is the first reference point wherein the target calculation category of statistical analysis is at least one of a median value, a maximum value, a minimum value, a mean value, a variance value, a standard deviation value, and the data statistical analysis value is a value corresponding to the target calculation category of data statistical analysis.

13. A non-transitory computer-readable storage medium having computer instructions stored thereon, wherein the computer instructions are configured to cause a computer to implement a method for processing map data, comprising:
    determining a first region for which a map display image is to be drawn;
    determining multiple first reference points within the first region according to a second region corresponding to the first region, wherein the first region is used as a second region or comprises multiple second regions;
    determining relative height data of the first region according to positions and real height data of all the first reference points; and
    determining a map display image of a position to be displayed according to the relative height data, wherein the position to be displayed is within the first region;
    wherein determining the relative height data corresponding to the first region according to the positions and the real height data of all the first reference points comprises:
    determining a height fitting equation corresponding to the first region;
    determining a first height fitting function according to the positions and real height data of all the first reference points and the height fitting equation, wherein the positions are independent variables of the first height fitting function and the real height data are dependent variables of the first height fitting function;
    determining a second reference point within the first region;
    subtracting a position corresponding to the second reference point from an independent variable in the first height fitting function to obtain a second height fitting function;
    using a parameter of the second height fitting function as a relative height data generation parameter corresponding to the first region; and
    determining the relative height data according to the relative height data generation parameter;
    wherein determining the map display image of the position to be displayed according to the relative height data comprises:
    determining a display height according to the real height data of the position to be displayed and the relative height data of the position to be displayed; and
    determining the map display image according to the display height.

* * * * *